United States Patent

Kubler et al.

[11] Patent Number: 6,143,387
[45] Date of Patent: Nov. 7, 2000

[54] UV SHIELD

[76] Inventors: Virginia L. Kubler; Lisa Y. Winckler, both of P.O. Box 5068, Martinsville, Va. 24115

[21] Appl. No.: 08/901,597

[22] Filed: Jul. 28, 1997

[51] Int. Cl.[7] .................................. B32B 9/00; B32B 7/12
[52] U.S. Cl. ........................ 428/41.7; 428/41.9; 428/345; 428/352; 428/354; 428/430; 257/680; 65/60.1; 216/24
[58] Field of Search .................... 428/41.7, 41.9, 428/345, 352, 354, 430; 257/680; 65/60.1; 156/272.2; 216/24

[56] References Cited

U.S. PATENT DOCUMENTS

| | | |
|---|---|---|
| Re. 28,883 | 6/1976 | Willdorf . |
| 4,318,975 | 3/1982 | Kuznetsov ............................ 430/260 |
| 4,540,622 | 9/1985 | Brunion et al. . |
| 4,631,214 | 12/1986 | Hasegawa . |
| 4,634,637 | 1/1987 | Oliver et al. ......................... 428/622 |
| 4,797,317 | 1/1989 | Oliver et al. ......................... 428/204 |
| 4,937,026 | 6/1990 | Goossens et al. ..................... 264/129 |
| 5,281,469 | 1/1994 | Baiocchi .............................. 428/216 |
| 5,466,819 | 11/1995 | Leistner et al. ....................... 548/259 |
| 5,558,912 | 9/1996 | Fagerburg et al. .................... 428/35.7 |
| 5,829,507 | 11/1998 | Pawlowski ........................... 160/368.1 |
| 5,843,548 | 12/1998 | Sanders .............................. 428/40.1 |

*Primary Examiner*—Blaine Copenheaver
*Assistant Examiner*—Arti R. Singh

[57] ABSTRACT

A protective film to be applied to glass or other material windows to prevent the penetration of 99.9% of ultraviolet (UV) radiation in the UV A and UV B wavelength.

11 Claims, 1 Drawing Sheet

UV SHIELD

BACKGROUND OF THE INVENTION

The media is full of information about the effects of too much sun exposure. Unfortunately, most people still link sun exposure to sunburn and only use protection when planning a full day of outside activities. As with most health issues, it is the years of daily short exposures that add up to the most sun damage. Just 10 minutes a day adds up to over an hour of unprotected sun exposure in just one week.

How much time do you spend in your automobile. What about commuting or just running errands? If you thought ultraviolet (UV) light rays couldn't find you in your car think again. While the windshield in most cars is very effective at screening UV, the rest of the windows only absorb a portion of the ultraviolet spectrum. Scientists used to think that the portion of the ultraviolet light that is transmitted through glass was "safe" ultraviolet but research continues to uncover the damaging effects of this higher wavelength UV. Still not a believer? Would you leave your drycleaning hanging in the car for a month? Most people wouldn't dream of leaving valuable clothing in a vehicle because of damage. Yet we drive for years without considering what may be occurring under our skin where the damage won't be seen until it is too late to repair. The most common means of transportation is the automobile but millions of miles and hours are spent in other modes, such as planes, trains, buses, all with various degrees of exposure to the sun.

Without radiation from the sun, the Earth would cease to exist. Sunshine is essential to plant and animal life but there are certain portions of this radiation that the human body could use in much smaller doses. Solar radiation is a form of electromagnetic radiation. Electromagnetic energy exists as waves. The length of one cycle of those waves is called a wavelength. These wavelengths are measured in nanometers (nm) which is 1 billionth of a meter. Different types of energy are distinguished by their "wavelength".

Scientists have split the solar energy from the sun into three bands of wavelengths. These three bands are Ultraviolet (100–400 nm), Visible Light (400–780 nm) and Near Infrared (780–2400 nm). As its name implies, visible light is the light that the human eye can see. Since individuals vary in their ability to detect visible light, the borders surrounding the visible light region are somewhat artificial. Near infrared radiation is the part of the sun's rays that warm the Earth. Ultraviolet is energy from the sun that we can neither see nor feel but these short wavelengths can have a tremendous effect on the human body.

Although ultra-violet light accounts for only 3% of the total solar spectrum, it is the most active part of the spectrum for photodamage. Photobiologists, scientist who study the effects of light on living things, have divided ultraviolet radiation into three groups of wavelengths. UV C (less than 290 nm), UV B (290–320 nm), and UV A (320–400 nm). All UVC and a portion of the UVB radiation is screened by the earth's ozone layer. UVB is screened completely by glass and many types of plastic glazing. UVB is most commonly known as the part of the UV spectrum which causes sunburn and is more potent than the longer wavelength UV A. UV A is not screened by glass and until recently sunscreens did not screen in the UV A region. Most sunscreens still provide very little UV A protection. While UV B is more potent, UV A makes up over 90% of the ultra-violet radiation that reaches the earth's surface. The total amount of UV that reaches the earth's surface varies by season, time of day, and geography. It is highest during summer, midday, and at the equator. It is important to understand that all ultraviolet light is not the same and that different wavelengths of UV may have varied effects on the body.

Most of the important functions of the human body happen inside our outer protective layer. In animals this protective skin layer is further covered by fur or hair but man has very little natural protection for the skin. Few people realize that the skin is the largest organ of the body. The skin is made up of an outer layer called the epidermis and an inner layer called the dermis. The epidermis is in a constant state of renewal. The top layer is in fact composed of flat dead skin cells and is known as the stratum corneum. These cells are shed in microscopic flakes in approximately four week cycles. New living cells from the bottom of the epidermis are constantly being formed and move toward the surface to repeat the cycle. The epidermis protects the body from bacteria and moisture loss.

The dermis layer lies below the epidermis and is up to forty times thicker. The dermis is composed of collagen and elastin fibers that provide support for the blood vessels, nerves, sweat glands, hair follicles, and sebaceous glands that are all a part of healthy functioning skin. Collagen and elastin fibers are important because they help the skin maintain its elastic properties. Damage to this layer leads to sagging and wrinkling of the skin. Fibrocytes, the cells that produce collagen fibers are also found in the dermis. At the interface between the dermis and epidermis are found the melanocytes. These cells contain the pigment melanin which gives skin its color.

The only other human organ which is exposed directly to the sun is the eye. While we have eyelids and eyelashes which offer some protection from dust and light, the eye is generally exposed to all forms of light, especially in young children. The viewing area of the eye is composed of the outer protective mucus membrane, the cornea, the aqueous humor, the iris, the pupil, the lens, the vitreous humor, and the retina. Damage can occur to the lens and the retina by exposure to sunlight. Young children are especially susceptible to retina damage since the lens does not develop its full potential to screen ultraviolet and blue light until adulthood.

The media is flooded with information about the need to wear sunscreen but few people understand the science behind those warnings or the consequences of ignoring them. Ultraviolet radiation has been shown to contribute to all three major types of skin cancer; photoaging of the skin (including wrinkling, pigment changes, and sagging); photosensitivity causing rashes and inflammation; and eye damage including partial blindness and cataracts. There is new research which indicates that ultraviolet radiation may in fact take away some of the body's natural immunity in subtle and specific ways.

The most recent statistics predict the future skin cancer rate will be a million or more cases per year in the United States alone. At that rate, one in six Americans will develop skin cancer during their lifetime according to the report. There are many theories for this increase but whatever the reason the number of cases is rising. While scientists do not know the exact reason for the increase, they are certain that skin cancer is linked to sun exposure.

Cancer is a group of diseases with one thing in common: cells become abnormal, dividing too often and without control or order. These malignant cells form a tumor that can invade and destroy nearby tissue. The cancer cells also can spread throughout the lymphatic system or the bloodstream to other parts of the body and form new tumors. The spread of cancer is called metastasis.

There are three types of skin cancer. The two most common types are basal cell carcinoma and squamous cell carcinoma. These two types account for over 90% of the skin cancer diagnosed in the United States. These are slow growing cancers which seldom spread to other parts of the body. Skin cancers of this type are the most curable. It is currently believed that these types of skin cancer are linked mainly to UV B exposure although UV A is now being studied as well.

The most deadly form of skin cancer is melanoma. Unlike the other two forms of skin cancer, malignant melanoma can quickly spread to other parts of the body if not treated early. There were 35,000 cases of malignant melanoma in 1995 and the number of cases is increasing at 4% per year. Up until recently, it was believed that melanoma was also caused predominantly by UV B. Research at the M. D. Anderson Cancer Center in Houston, Tex. has indicated that while using sunscreen did prevent non-melanoma skin cancers, the sunscreen (which screened mostly in the UV B wave length) had no effect in preventing melanoma. Further evidence of UV A effects came from a study of tanning bed users conducted in Sweden by researchers at University Hospital in Lund. The results were published in the American Journal of Epidemiology, October 1994. Tanning beds use UV A radiation to give users a supposedly "safe" tan. The study found that tanning bed users under the age of 30 who used tanning beds more than 10 times a year had more than seven times the risk of melanoma. At the current rate of melanoma increase that would raise the risk for tanning bed users to about 1 in 13. This research along with other studies makes the case against UV A rays so great that the American Medical Association again recommended (in December 1994) that tanning beds be banned for anything but medical use. While no one is sure how UV A radiation effects the skin, some researchers believe that it lowers the immune system's ability to function properly.

Most people believe that as we get older our skin naturally begins to wrinkle and sag. While that is true to some extent, scientists believe that as much as 80% of these signs of aging it can also lead to permanent loss of vision. The damage is caused by visible blue light and UVA. The prevention for this is the age old adage—never look directly at the sun! Other forms of retina damage can also occur from common exposure to sunlight. Infants, children, and teens are more susceptible to damage from ultra-violet radiation. While the cornea absorbs any radiation below 295 nm, the lens slowly develops its ability to absorb UVA and blue light reaching its full absorption ability at adulthood.

Unfortunately, since the lens develops into a good UV A absorber, it is susceptible to damage caused by too much UV absorption. Since the lens cannot shed damaged cells there is no way for it to repair itself. This damage often leads to cloudy vision and a condition known as cataracts.

Skin cancer, sunburn, pigment spots, rashes, cataracts, retina damage, and wrinkles have all been linked to exposure to ultraviolet radiation. While scientists work on ways to repair this damage, the best possible defense is prevention. It is never too late to start protecting your skin and eyes from UV damage. Ultraviolet screening techniques and limiting sun exposure can prevent further damage and in some cases the damage may be reversible with proper protection. Living in the dark would be as unhealthy to mental well-being as basking in the sun is to the skin and eyes. Using common sense and taking advantage of the ultra-violet screening techniques available will help protect you and your family from the damage caused by the sun's UV rays.

PRIOR ART

The prior art is replete with products and methods for reducing injury from exposure to the sun's rays. A partial listing of such products and methods follow:

Protection from UV B.
1. Glass and some forms of plastic glazing materials screen UVB.
2. Wear protective clothing. Fabric should be of a tight weave. T-shirts offer little protection and have an SPF of about 6. Special UV clothes are available.
3. Use sunscreen with an SPF of at least 15. Apply at least 15 minutes before sun exposure. Use it year around—remember clouds do not screen UV!
4. Stay out of the sun between the hours of 10:00 a.m. and 3:00 p.m.
5. Wear a wide-brimmed hat. Baseball hats do not protect the neck and ears.
6. Sunglasses will screen most UVB because they are glass or plastic.

Protection from UV A
1. Glass does not screen UV A. Therefore, windows of all types, including homes, should have some additional form of UV protection.
2. Wear protective clothing. are in fact due to sun exposure. Photoaging is characterized by wrinkles, coarsening, dryness, loss of elastic behavior and pigment changes. The most important change in the skin occurs in the dermis where the elastin fibers which should be linear become thickened and tangled and eventually progress into a single mass of non-elastic material. This severe deterioration of the elastin fibers is not seen in sun-protected skin. UV A radiation goes deeper into the skin and will cause elastosis more deeply in the dermis than UV B radiation. The effects of ultraviolet exposure are cumulative and take years to become apparent. In addition to wrinkles, many of the pigment changes associated with aging skin are related to sun exposure. Liver spots, moles, and white patches are all related to getting too much sun. Because children and teenagers spend so much time out in the sun it is estimated that as much as 80% of UV induced photoaging may occurs within the first 20 years of life. There is additional new research which indicates that young skin may be more susceptible to solar damage than older skin. Babies are especially vulnerable to damage from ultra-violet rays.

Photoaging is reversible to some extent and proper screening of ultra-violet rays can improve the skin, but the best defense is prevention. Dermatologists agree—there is no such thing as a "safe" tan from the sun or a tanning bed.

The most commonly used term to describe the symptoms of photosensitivity is "sun poisoning". Photosensitivity usually manifests itself as a rash or skin reaction to some form of solar radiation. People who have never been photosensitive may experience these symptoms while using certain drugs such as tetracycline, sulfa, or chlorpromazine. Eating certain foods such as limes in combination with sun exposure may cause a reaction in some people. Perfumes and other skin products may also cause a reaction. Many photosensitive people react to UVA rays and most sunscreens will not alleviate the reaction.

Some of the more severe photosensitive reactions take place in people with lupus. Somewhere between 40–60% of lupus patients are photosensitive and some are extremely sensitive to ultraviolet light from any source. In addition, many lupus patients have difficulty wearing sunscreens because they cause their own skin rash.

The most severe form of photosensitivity is xeroderma pigmentosum (XP), a rare hereditary disease. XP patients, are so sensitive to ultraviolet rays that they develop skin cancer usually before the age of ten. Their skin is incapable of repairing the DNA damage that is done to the skin with each exposure to ultra-violet radiation. Normal skin can repair this DNA damage to some extent so it may take fifty or sixty years to see the same cancer develop.

As the only other organ exposed to the sun, the eye is also prone to damage from its rays. When ultra-violet rays enter the eye they can damage the protective conjunctiva membrane, the cornea, the lens, or the retina. The most permanent form of eye damage is solar retinopathy which is caused by gazing directly into the sun. While this may be reversible 3. Use a broad-spectrum sunscreen that screens into the UV A. Any sunscreen which blocks any amount of the UV A may be called "broad spectrum". Products with oxybenzone block some of the UV A spectrum. Look for a sunscreen with avobenzone for improved UV A protection. Remember, the SPF number only refers to UV B protection. Sunburn protection does not mean damage protection.
4. Stay out of the sun between 10:00 and 3:00.
5. Wear a wide-brimmed hat.
6. Wear sunglasses that block UV B and UV A. Wearing sunglasses without this protection is actually worse than wearing no sunglasses since the dark glasses allow the pupil to dilate and let more UV in than if you were not wearing sunglasses.

Most UV screening methods work through the use of UV absorbers which lose some of their ability to absorb UV over time. If you are photosensitive you may want to have your glasses and film checked annually to assure maximum protection.

Special Notes for Children
1. Sunscreen is not recommended as a protective measure for children under the age of six months. The lotion won't harm them, it is just not enough protection for their sensitive skin. Children this young should be kept in the shade.
2. Children's skin is more susceptible to permanent damage. Create the life long habit of wearing sunscreen and a hat. Limit exposure at the peak sun hours.
3. Children of all ages including infants should have sunglasses with UV screening. Apply UV screening film to your car to protect young eyes and skin from lasting damage.

Sunscreen application will soon be like shaving or applying make-up. Sunglasses are already widely used and wide-brimmed hats in many styles are available in stores everywhere. The easiest tip of all may be the installation of UV screening film on your vehicle. The film will be working whenever you or your family use the vehicle. Remember small doses of UV every day will add up to years of sun exposure. Don't hide from the sun, just learn to enjoy it safely.

U.S. Pat. No. 4,797,317 to Oliver et al discloses a plastic film applied to automobile windows as an after market add on product. The film has a UV absorber incorporated into it however, the composition of the absorber is not disclosed. The film uses a metalized layer to reflect a part of the visible light without exceeding the safety standards adopted by most states.

U.S. Pat. No. 4,556,606 to Olson discloses a coating material for coating plastic products to prevent premature yellowing of those products. The plastic of the articles is usually a polyester-carbonate and the coating is an acrylic containing UV absorbers. There is a long list of benzophenones and triazoles that may be used as UV absorbers.

SUMMARY OF THE INVENTION

It is an object of this invention to provide protection from the deleterious effects of that portion of the electromagnetic or light spectrum known as ultraviolet. The ultraviolet shield may be used to cover any medium or opening through which UV can penetrate. By interposing the UV shield between a source of ultraviolet emissions and a photosensitive receptor, the photosensitivity of the receptor is not activated thereby preventing harm to the receptor.

It is an object of this invention to provide a thin, flexible, and pliable film having included therein or thereon chemical compositions which act as absorbers for UV light. The film may be unitary or made of laminated plies. It may be employed by itself or it may be applied to other materials for the requisite structural strength.

It is an object of this invention to provide a film including UV absorbers which may be adhered to the surfaces of any material which covers openings in a structure which openings are usually termed, windows. The structure may be mobile or stationary. Windows are usually made of glass or some composite of glass and plastic, the normal function of which is to pass visible light from one side to the other. Various other materials, such as steel, have been fabricated to transmit visible light and the film of this invention may be adhered to any such materials.

It is an object of this invention to protect the occupants of automobiles, buses, airplanes, houses, stores and factories by preventing UV from penetrating into the interior spaces through windows or other covered openings that transmit visible light. With regard to automobiles, there are federal and state laws and guidelines regulating the required amount of visible light that must be transmitted for safety and identification. It is a further object of this invention to meet or exceed these standards.

DETAILED DESCRIPTION OF THE INVENTION

Figure 1:
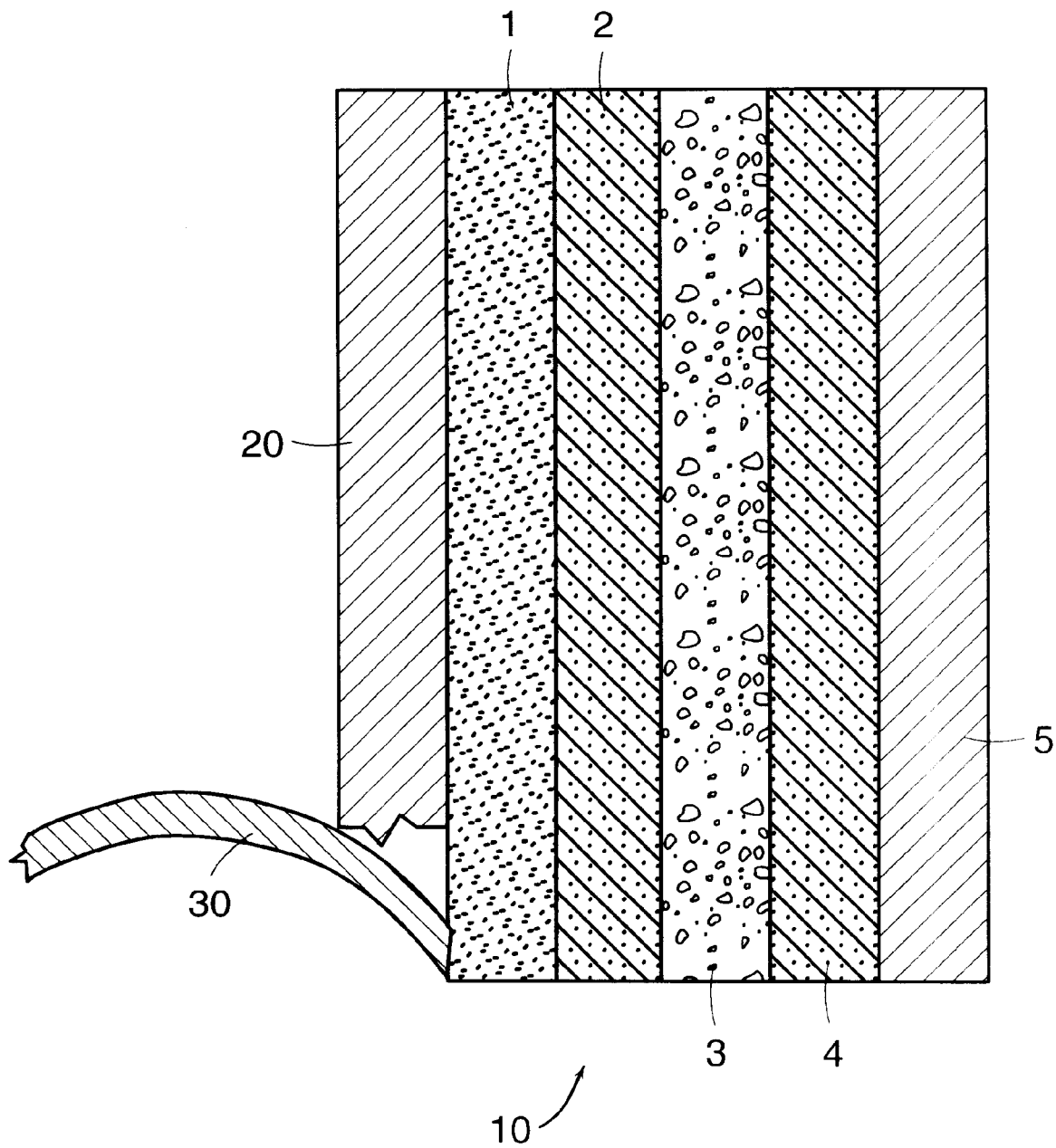
FIG. 1 is a cross section of a preferred embodiment of the film of this invention.

The composite film 10 is made up of various layers or plies. The part of the film which contacts the structural member of the window 20 or faces the source of the UV has a pressure sensitive adhesive coating 1 or other means for affixing the film to the structural member. The adhesive is compatible with the material of the structural member 20 and the film ply 2 upon which it is coated. For example, the adhesive may be an acrylic or urethane pressure sensitive adhesive or a polyester, if the structural member is glass. The pressure sensitive adhesive is initially covered by a conventional release liner 30 which covers the adhesive until it is removed prior to use of the film. The pressure sensitive adhesive is laminated onto one surface of layer 2 of polyethylene terephthalate (PET) film. While PET is preferred, the film layer could be a polyester or polycarbonate. The film contains a dye and a UV absorber. The dye merely tints the film to a desired color. It may be omitted. The preferred UV absorber for this film is 2,2'-Dihydroxy-4,4-methoxy benzophenone. Alternative compounds include other compatible members of the benzophenone family and compatible members of the benzatriazole family.

To the opposite surface of this layer 2 is affixed a layer 3 of laminating adhesive. The laminating adhesive 3 is a polyester resin crosslinked with an isocyanate. Alternative compositions could be acrylic pressure sensitive adhesives or uncrosslinked PET.

The laminating adhesive 3 contacts and fixes another layer 4 of PET containing a dye and a UV absorber. Film layers 2 and 4 may be identical or similar in make up.

Coated onto the outer surface of the layer 4 is a scratch resistant layer 5. This layer serves to protect the film from damage through normal wear and tear. The preferred scratch resistant coating is a hard acrylic polymer. The term, "hard," does not necessarily denote stiffness but refers to a surface that is not easily marred. Other compositions which form protective layers include urethanes and certain inorganic chemical materials.

The particular mechanism by which this film achieves it's result is not completely understood however, the results are substantial as shown by the following example:

EXAMPLE 1

| Layer | % by wt. | Thickness (microns) |
|---|---|---|
| Scratch resistant | | 1.8 |
| PET film w/dye and absorber | 3–4(absorber) | 12.0 |
| Laminating adhesive | | 0.8 |
| PET film w/dye and absorber | 3–4(absorber) | 12.0 |
| Mounting adhesive | 8 | 5.0 |
| | Thickness | 31.6 |

The film of this example was adhered to a clear glass of ⅛" thickness. Total visible light transmission was 73–83% which meets safety and other guidelines for automobiles. Approximately 99.9% of UV between 290–380nm (UV A and B) was blocked or did not penetrate.

Other modifications and variations of the present invention are possible in light of the above teachings. It is, therefore, to be understood that changes may be made in the particular embodiment of the invention described herein which are within the full intended scope of the invention as defined by the appended claims.

What is claimed is:

1. A laminate which transmits at least 73% of visible light and blocking at least 99.9% of UV light between 290–380 nanometers, said laminate comprising in order:

a first adhesive layer, a first PET layer containing UV absorber, a second adhesive layer, a second PET layer containing UV absorber, and a scratch resistant layer.

2. A laminate according to claim 1 wherein at least one of said PET layers further contains a dye.

3. A laminate according to claim 2 wherein said UV absorber is a benzophenone.

4. A laminate according to claim 3 wherein said first adhesive layer is covered by a release liner.

5. A laminate according to claim 1 wherein said UV absorber is a benzophenone.

6. A laminate according to claim 5 wherein said first adhesive layer is covered by a release liner.

7. A laminate according to claim 1 wherein said first adhesive layer is covered by a release liner.

8. A laminate which transmits at least 73% of visible light and blocking at least 99.9% of UV light between 290–380 nanometers, said laminate comprising in order:

a layer of glass, a first adhesive layer, a first PET layer containing UV absorber, a second adhesive layer, a second PET layer containing UV absorber, and a scratch resistant layer.

9. A laminate according to claim 8 wherein at least one of said PET layers further contains a dye.

10. A laminate according to claim 9 wherein said UV absorber is a benzophenone.

11. A laminate according to claim 8 wherein said UV absorber is a benzophenone.

\* \* \* \* \*